(12) United States Patent
Bercovich et al.

(10) Patent No.: US 9,785,653 B2
(45) Date of Patent: *Oct. 10, 2017

(54) SYSTEM AND METHOD FOR INTELLIGENTLY DETERMINING IMAGE CAPTURE TIMES FOR IMAGE APPLICATIONS

(75) Inventors: Moshe Bercovich, Haifa (IL); Alexander Kenis, Kiryat Motzkin (IL); Eran Cohen, Haifa (IL); Wiley H. Wang, Pacifica, CA (US)

(73) Assignee: Shutterfly, Inc., Redwood City, CA (US)

( * ) Notice: Subject to any disclaimer, the term of this patent is extended or adjusted under 35 U.S.C. 154(b) by 1009 days.

This patent is subject to a terminal disclaimer.

(21) Appl. No.: 13/603,181

(22) Filed: Sep. 4, 2012

(65) Prior Publication Data

US 2012/0328190 A1    Dec. 27, 2012

Related U.S. Application Data

(63) Continuation-in-part of application No. 13/033,513, filed on Feb. 23, 2011, now Pat. No. 8,655,893.

(60) Provisional application No. 61/364,889, filed on Jul. 16, 2010.

(51) Int. Cl.
*G06F 17/30* (2006.01)

(52) U.S. Cl.
CPC .............................. *G06F 17/30268* (2013.01)

(58) Field of Classification Search
CPC ........... G06F 17/3028; G06F 17/30268; G06F 17/30244; G06F 17/30598; G06F 17/30064; G06F 17/30256; G06F 17/30265; G06F 17/30247
See application file for complete search history.

(56) References Cited

U.S. PATENT DOCUMENTS

| | | | |
|---|---|---|---|
| 5,331,550 A | 7/1994 | Stafford | |
| 6,718,063 B1 | 4/2004 | Lennon | |
| 7,636,733 B1 * | 12/2009 | Rothmuller | ....... G06F 17/30265 |
| | | | 707/953 |
| 2003/0048950 A1 | 3/2003 | Savakis | |
| 2006/0200475 A1 * | 9/2006 | Das | .................. G06F 17/30256 |
| | | | 707/999.1 |
| 2007/0189333 A1 * | 8/2007 | Naaman | ..................... G06F 1/14 |
| | | | 370/477 |
| 2007/0271297 A1 | 11/2007 | Jaffe | |
| 2008/0205771 A1 * | 8/2008 | Kraus | ............... G06F 17/30247 |
| | | | 382/224 |

(Continued)

*Primary Examiner* — Ashish K Thomas
*Assistant Examiner* — Rezwanul Mahmood
(74) *Attorney, Agent, or Firm* — Xin Wen

(57) ABSTRACT

A method for organizing images from multiple image capture devices includes automatically determining a coarse offset between image capture times recorded in a first image capture device and image capture times recorded in a second image capture device. The coarse offset is determined by a computing a correlation between image counts of images captured by the first image capture device and images captured by the first image capture device. The method also includes adjusting the image capture times of images recorded in the second image capture device by the coarse offset to produce adjusted image capture times for images captured by the second image capture device.

21 Claims, 13 Drawing Sheets

(56) References Cited

U.S. PATENT DOCUMENTS

| | | | |
|---|---|---|---|
| 2008/0298766 A1* | 12/2008 | Wen | G06F 17/30259 386/282 |
| 2009/0063557 A1 | 3/2009 | MacPherson | |
| 2009/0150772 A1* | 6/2009 | Noda | G06F 3/0481 715/277 |
| 2009/0196510 A1 | 8/2009 | Gokturk | |
| 2009/0252429 A1 | 10/2009 | Prochazka | |
| 2010/0128919 A1* | 5/2010 | Perronnin | G06F 17/30247 382/100 |
| 2010/0149372 A1* | 6/2010 | Silverstein | H04N 5/2258 348/223.1 |
| 2010/0183280 A1* | 7/2010 | Beauregard | G11B 27/034 386/285 |
| 2010/0213251 A1* | 8/2010 | Hvidtfeldt | H04N 1/00132 235/375 |
| 2012/0328190 A1* | 12/2012 | Bercovich | G06F 17/30268 382/165 |
| 2013/0011083 A1* | 1/2013 | Berkovich | G06F 17/30244 382/305 |
| 2013/0064476 A1* | 3/2013 | Cohen | G06F 17/30064 382/305 |

* cited by examiner

SYSTEM AND METHOD FOR INTELLIGENTLY DETERMINING IMAGE CAPTURE TIMES FOR IMAGE APPLICATIONS

CROSS-REFERENCE TO RELATED APPLICATIONS

The present invention is a continuation-in-part application of and claims priority to commonly assigned pending U.S. patent application Ser. No. 13/033,513, titled "Organizing images captured by multiple image capture devices", filed on Feb. 23, 2011 now U.S. Pat. No. 8,655,893. U.S. patent application Ser. No. 13/033,513 claims priority to commonly assigned pending U.S. provisional patent application No. 61/364,889, entitled "Organizing images captured by multiple digital cameras" filed Jul. 16, 2010 by the same inventors. The content of above applications is incorporated herein by reference.

BACKGROUND OF THE INVENTION

In recent years, photography has been transformed from chemical based technologies to digital imaging technologies. A phenomenon associated with digital photography is the large number of images that an average user can generate and have to organize in a short period of time. A typical vacation trip can easily produce hundreds to thousands of digital images. Digital images can be captured by different types of imaging devices. A typical household may own a number of image capture devices such as single-lens reflex (SLR) and point-and-shoot digital cameras manufactured by Canon, Nikon, Kodak, HP, etc., camera phones made by Nokia, Apple Computer, Samsung, HTC, Motorola, etc., and video cameras that can take still images.

The captured images can be stored on local computer devices or remote servers, and can be viewed locally or online. Digital images can also be used to create personalized image products such as photo books, photo calendars, photo cards, photo stationeries, photo prints, photo mugs, photo T-shirts, and so on. Some image products (e.g. photo books, calendars, and collages) can incorporate tens to hundreds of images obtained by different image capture devices. Some image usages involve digital images taken by different users. For example, an image share site may publish a large number of images captured with different devices by different users that are associated with each other in an extended family, as classmates, members of a club or a sport team, etc.

A challenge associated with organizing digital images is that the digital images from different imaging devices often do not carry consistent information. The file names from different cameras are different. Some image capture devices include EXIF (Exchangeable image file format) header files; but some don't. Additionally, the information stored in the EXIF header files may not be correct. For example, many users do not set the clocks in their digital cameras. The clock times of many cameras are still based on the default start times (12:00:00 2006/1/1, 12:00:00 2008/1/1/) originally set in the factories.

There is therefore a need to effectively organize a large number of images to allow users to conveniently create image products and share images.

SUMMARY OF THE INVENTION

In one aspect, the present invention relates to a method for intelligently determining capture times of images for image applications. The method includes: dividing a first group of images with known image capture times into first subclusters based on similarities between images, wherein each of the first subclusters comprises images from the first group having adjacent image capture times; dividing a second group of images with unknown image capture times into second subclusters based on similarities between images; computing, by a computer system, a similarity value between a first subcluster of images with known image capture times and a second subcluster of images with unknown image capture times; and assigning an image capture time of the first subcluster of images to the second subcluster of images if the similarity value between the first subcluster of images and the second subcluster of images is above a first threshold.

Implementations of the system may include one or more of the following. The method can further include sequencing the first group of images in a chronological order based on image capture times; and dividing the first group of images into successive clusters based on the image capture times before the step of dividing a first group of images with known image capture times into first subclusters, wherein each of the successive clusters is subdivided into one or more first subclusters. The images in one of the first subclusters have similarity values higher than a second threshold. The method can further include sequencing the second group of images before the step of dividing a second group of images into second subclusters, wherein the second subclusters each comprise images adjacent in the sequence. The images in the second group can be sequenced based on a parameter that is not image capture time. The images in the second group are sequenced based on a parameter selected from the group consisting of file names, image upload times, image reception times, and image processing times. The images in one of the second subclusters can have similarities higher than a third threshold. The step of calculating a similarity value between a first subcluster of images and the second subcluster of images can include calculating differences in one or more of parameters between the images in the first subcluster and the images the second subcluster, wherein the similarity value is inversely related to the differences, wherein the one or more of parameters comprise one or more of dominant colors, color distributions, image capture locations, detected faces, recognized faces, the number of people, sizes and/or prominence of the faces, detected objects, recognized objects, or sizes and/or prominence of objects in the images. The step of computing, by a computer system, a similarity value between a first subcluster of images with known image capture times and a second subcluster of images with unknown image capture times can include calculating differences of a set of parameters between the first subcluster of images and the second subcluster of images; setting up a topological space based on the set of parameters; and calculating a topological distance in the topological space between the first subcluster of images and the second subcluster of images based on the calculated differences, wherein the similarity value is inversely related to the topological distance. The first group of images with known image capture times can be obtained by multiple image capture devices can further include adjusting, by an offset, image capture times recorded by at least one of the multiple image capture devices. The step of assigning can include assigning a unified image capture time of the first subcluster of images to the second subcluster of images if the similarity value between the first subcluster of images and the second subcluster of images is above the first threshold. The method can further include characterizing the first group of images by unified image capture times which adjust offset(s) between image capture times recorded by different ones of the multiple image capture devices. The method can further include sequencing the first group of images and the second group of images in a chronological order based on their respective image capture times. The method can further include allowing at least some of the first group of images and the second group of images to be incorporated in the chronological order into a design of an image product. The image product can include a photobook, a photo calendar, a photo story, a photo blog, or a photo slideshow. The method can further include allowing at least some of the first group of images and the second group of images to be displayed, shared or published in the chronological order. The method can further include allowing at least some of the second group of images to be incorporated into a design of an image product based on the image capture times assigned to the second group of images. The image product can include a photobook, a photo calendar, a photo story, a photo blog, or a photo slideshow. The method can further include allowing at least some of the second group of images to be displayed, shared or published based on the image capture times assigned to the second group of images. The method can further include tagging the second group of images by the image capture times assigned to the second group of images. The method can further include allowing the second group of images to be searched or categorized based on the image capture times assigned to the second group of images.

In another aspect, the present invention relates to a method for organizing images from multiple image capture devices. The method includes: automatically determining, by a computer system, a coarse offset between image capture times recorded in a first image capture device and image capture times recorded in a second image capture device, wherein the coarse offset is determined by a computing a correlation between image counts of images captured by the first image capture device and images captured by the first image capture device; and adjusting the image capture times of images recorded in the second image capture device by the coarse offset to produce adjusted image capture times for images captured by the second image capture device.

Implementations of the system may include one or more of the following. The method can further include sequencing images captured by the first image capture device based on the image capture times recorded by the first image capture device; sampling image counts of images captured by the first image capture device to produce a first image count distribution (ICD); sequencing images captured by the second image capture device based on the image capture times recorded by the second image capture device; sampling image counts of images captured by the second image capture device to produce a second ICD; computing a correlation function between the first ICD and the second ICD by the computer system; identifying, in the correlation function, one or more correlation peaks that are above a correlation threshold; and obtaining one or more coarse offsets from the one or more correlation peaks. The method can further include for the images associated with one of the one or more correlation peaks above the correlation threshold, computing a similarity value between images captured by the first image capture device and by the second image capture device by the computer system; automatically determining a fine offset between the image capture times recorded in the first image capture device and the image capture times recorded in the second image capture device if the similarity value is above a similarity threshold value; and adjusting the image capture times of the images captured by the second image capture device by the fine offset. The step of calculating a similarity value between images captured by the first image capture device and by the second image capture device can include calculating differences in one or more of parameters between the images captured by the first image capture device and by the second image capture device, wherein the similarity value is inversely related to the differences, wherein the one or more of parameters comprise colors, color distributions, textures, image capture locations, faces and bodies detected in the images, recognized faces, the number of people, texture and colors of hair and hats if found in the images, sizes and/or prominence of the faces, detected objects, recognized objects, or sizes and/or prominence of objects in the images.

In another aspect, the present application relates to a computer system that includes one or more computer processors that can enable the determination of an offset between image capture times recorded in a first image capture device and image capture times recorded in a second image capture device, to adjust the image capture times recorded in the second image capture device by the offset to produce adjusted image capture times, and to sequence images taken by the first image capture device and the second image capture device in an chronological order, wherein the sequencing is based on the image capture times for the images captured by the first image capture device and the adjusted image capture times for the images captured by the second image capture device.

In another aspect, the present application relates to a method for organizing images from multiple image capture devices. The method includes allowing the determination of an offset between image capture times recorded in a first image capture device and image capture times recorded in a second image capture device; adjusting the image capture times recorded in the second image capture device by the offset to produce adjusted image capture times by a computer processor; and sequencing images taken by the first image capture device and the second image capture device in an chronological order, wherein the sequencing is based on the image capture times for the images captured by the first image capture device and the adjusted image capture times for the images captured by the second image capture device.

Implementations of the system may include one or more of the following. The method can further include sequencing images captured by the first image capture device based on the image capture times recorded by the first image capture device; and sequencing images captured by the second image capture device based on the image capture times recorded by the second image capture device. The step of allowing the determination of an offset can include sampling image counts of images captured by the first image capture device at a first time interval to create a first image count distribution (ICD); sampling image counts of images captured by the second image capture device at the first time interval to create a second ICD; computing a first correlation function between the first ICD and the second ICD by a computer; and using the correlation function to determine a first value for the offset between image capture times in the first image capture device and the second image capture device. The first value for the offset can be determined by the maximum value in correlation function. The first time interval can be in a range from about 2 min to about 45 min. The step of allowing the determination of an offset further can include sampling image counts of images captured by the first image capture device at a second time interval to create a third image count distribution (ICD); sampling image counts of images captured by the second image capture device at the first time interval to create a fourth ICD; computing a second correlation function between the third ICD and the fourth ICD; using the correlation function to determine a second value for the offset between image capture times in the first and the second image capture devices; and selecting one of the first value and the second value, wherein the image capture times recorded in the second image capture device are adjusted by the selected one of the first value and the second value. The step of allowing the determination of an offset further comprises: allowing a user to select, using a computer device, a first image captured by the first image capture device and a second image captured by the second image capture device and to identify the first image and the second image to be taken at about the same time; and computing the offset based on image capture times of the first image and the second image. The offset is related to the difference between the clock times in the first image capture device and the second image capture device. The method can further include allowing the images taken by the first image capture device and the second image capture device in the chronological order to be displayed on a computer device. The computer device can be connected to the computer processor via a computer network. The computer processor can reside in the computer device. The first image capture device and the second image capture device can include at least one of a digital camera, a camera phone, a video camera, a laptop computer, or a tablet computer. The method can further include allowing images from the first image capture device and the second image capture device to be incorporated, in the chronological order, into the design of an image product. The method can further include allowing images from the first image capture device and the second image capture device to be published in the chronological order on a web media. The web media can include a blog page.

Embodiments may include one or more of the following advantages. The disclosed methods and systems can significantly save users' times spent on organizing a large number of digital images captured by different image capture devices. The disclosed methods and systems can intelligently compensate for discrepancies in clock times between different image capture devices, and automatically sequence images from different image capture devices in a correct chronological order. The disclosed methods and systems can make it easier for users to use images to tell a story about their memories. The disclosed methods and systems also make it easier for users to create image products such as photo books and create photo blog pages using images captured by different image capture devices.

Although the invention has been particularly shown and described with reference to multiple embodiments, it will be understood by persons skilled in the relevant art that various changes in form and details can be made therein without departing from the spirit and scope of the invention.

DETAILED DESCRIPTION OF THE INVENTION

Figure 1:
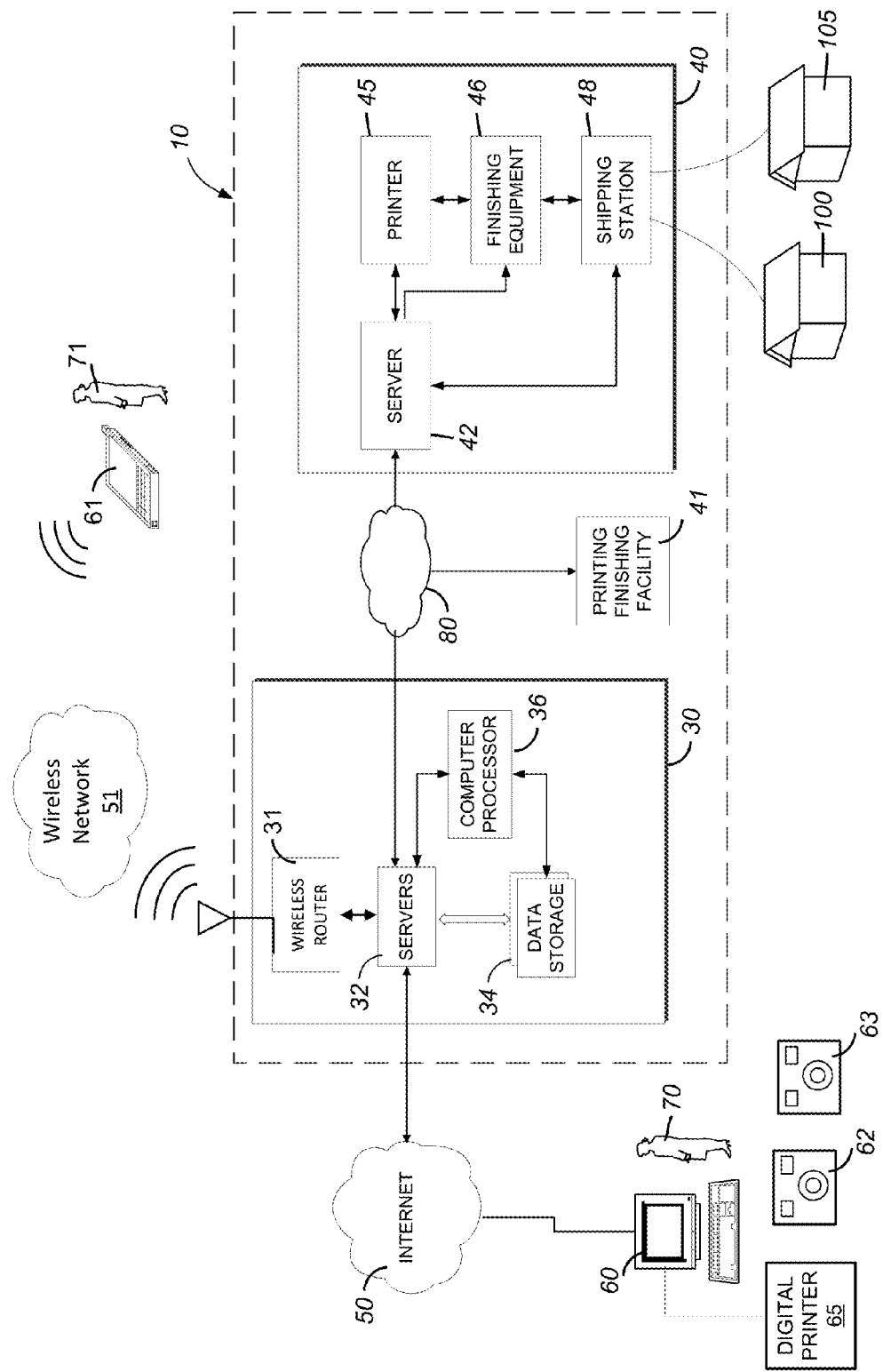
FIG. 1 is a block diagram for an imaging service system for producing personalized image products in accordance with the present invention.

Referring to FIG. 1, an imaging service system 10 can enable users 70, 71 to organize and share images via a wired network or a wireless network 51. Optionally, the imaging service system 10 can also fulfill image products for the users 70, 71. The imaging service system 10 includes a data center 30, one or more product fulfillment centers 40 and 41, and a computer network 80 that facilitates the communications between the data center 30 and the product fulfillment centers 40 and 41.

The data center 30 can include a server 32 for communicating and receiving input from the users 70, 71, a data storage device 34 for storing user data, image and design data, and a computer processor 36 for rendering images, organizing images, and processing orders. The user data can include account information, discount information, and order information associated with the user. A website can be powered by the servers 32 and can be accessed by the user 70 using a computer device 60 via the Internet 50, or by the user 71 using a wireless device 61 via the wireless network 51.

The imaging service system 10 can provide products that require user participation in designs and personalization. Examples of these products include the personalized image products provided by Shutterfly, Inc. In the present disclosure, the term "personalized" refers to the information that is specific to the recipient, the user, the gift product, and the occasion, which can include personalized content, personalized text messages, personalized images, and personalized designs that can be incorporated in the image products. The content of personalization can be provided by a user or selected by the user from a library of content provided by the service provider. The term "personalized information" can also be referred to as "individualized information" or "customized information". Furthermore, the terms "photo", "image" and "picture" are used synonymously in the present disclosure.

Personalized image products can include users' photos, personalized text, personalized designs, and content licensed from a third party. Examples of personalized image products may include photo books, personalized greeting cards, photo stationery, photo or image prints, photo posters, photo banners, photo playing cards, photo T-shirts, photo coffee mugs, photo pads, photo key-chains, photo collectors, photo coasters, or other types of photo gift or novelty item. Photo book generally refers to bound multi-page product that includes at least one image on a book page. Photo books can include photo albums, scrapbooks, bound photo calendars, or photo snap books, etc.

The user 70 or her family may own multiple cameras 62, 63. The user 70 transfers images from cameras 62, 63 to the computer device 60. The user 70 can edit, organize images from the cameras 62, 63 on the computer device 60. The computer device 60 can be in many different forms: a personal computer, a laptop, or tablet computer (e.g. IPad), a mobile phone etc. The camera 62 can include a camera that is integrated or connected with in the computer device 60. For example, laptop computers or computer monitors can include built-in camera for picture taking The user 70 can also print pictures using a printer 65 and make image products based on the images from the cameras 62, 63. The cameras 62, 63 can include a digital camera, a camera phone, a video camera capable of taking still images, a laptop computer, or a tablet computer.

The images from the cameras 62, 63 can also be uploaded to the server 32 to allow the user 70 to organize and render images at the website, share the images with others, and design or order image product using the images from the cameras 62, 63. The wireless device 61 can include a mobile phone, a tablet computer, or a laptop computer, etc. The wireless device 61 can include a built-in camera (e.g. in the case of a camera phone). The images taken by the user 71 using the wireless device 61 can also be uploaded to the data center 30. If users 70, 71 are members of a family or associated in a group (e.g. a soccer team), the images from the cameras 62, 63 and the mobile device 61 can be grouped together to be incorporated into an image product such as a photo book, or used in a blog page for an event such as a soccer game.

Figure 2:
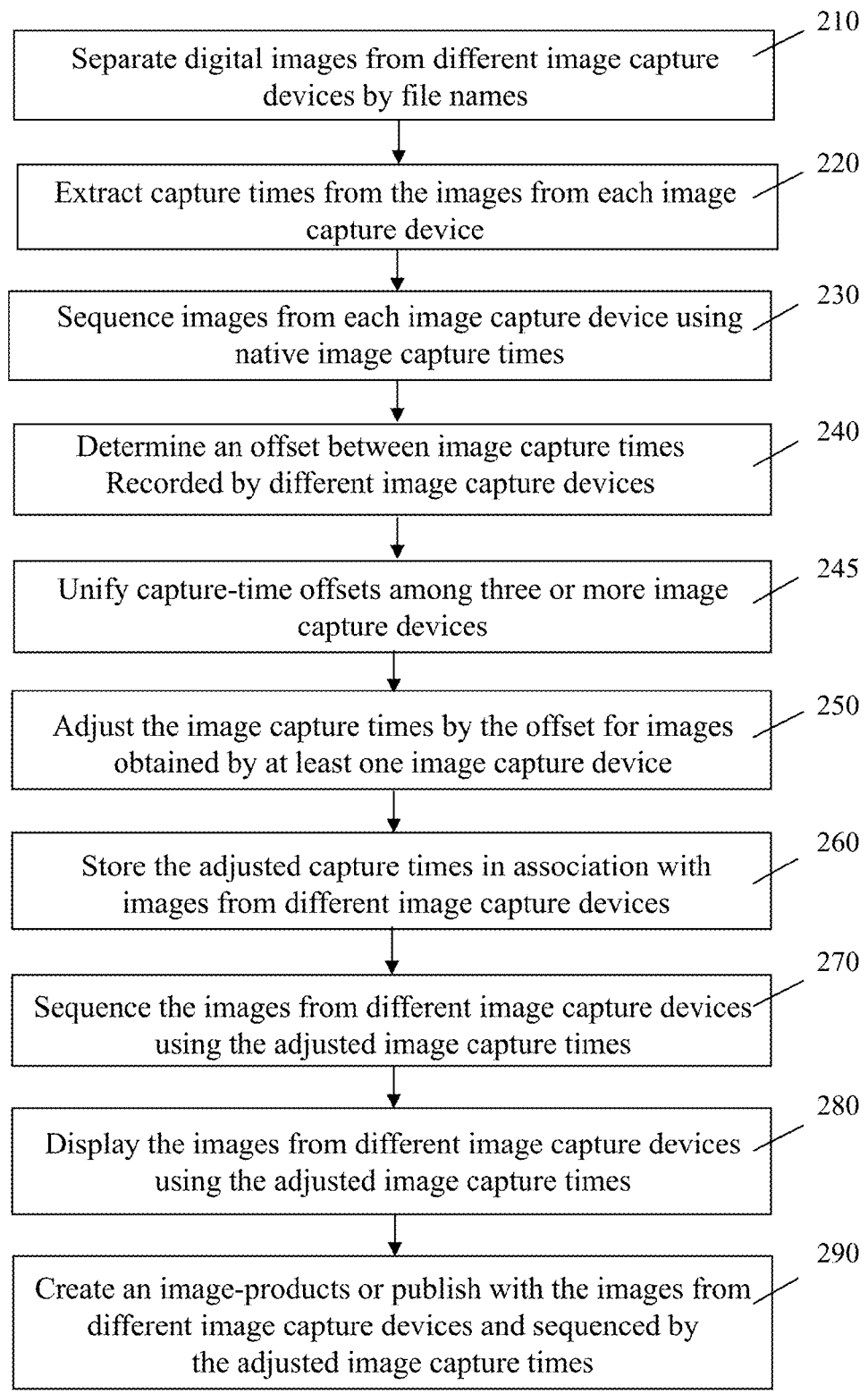
FIG. 2 is a flowchart for intelligently organizing images from different image capture devices in accordance with the present invention.
Figure 3:
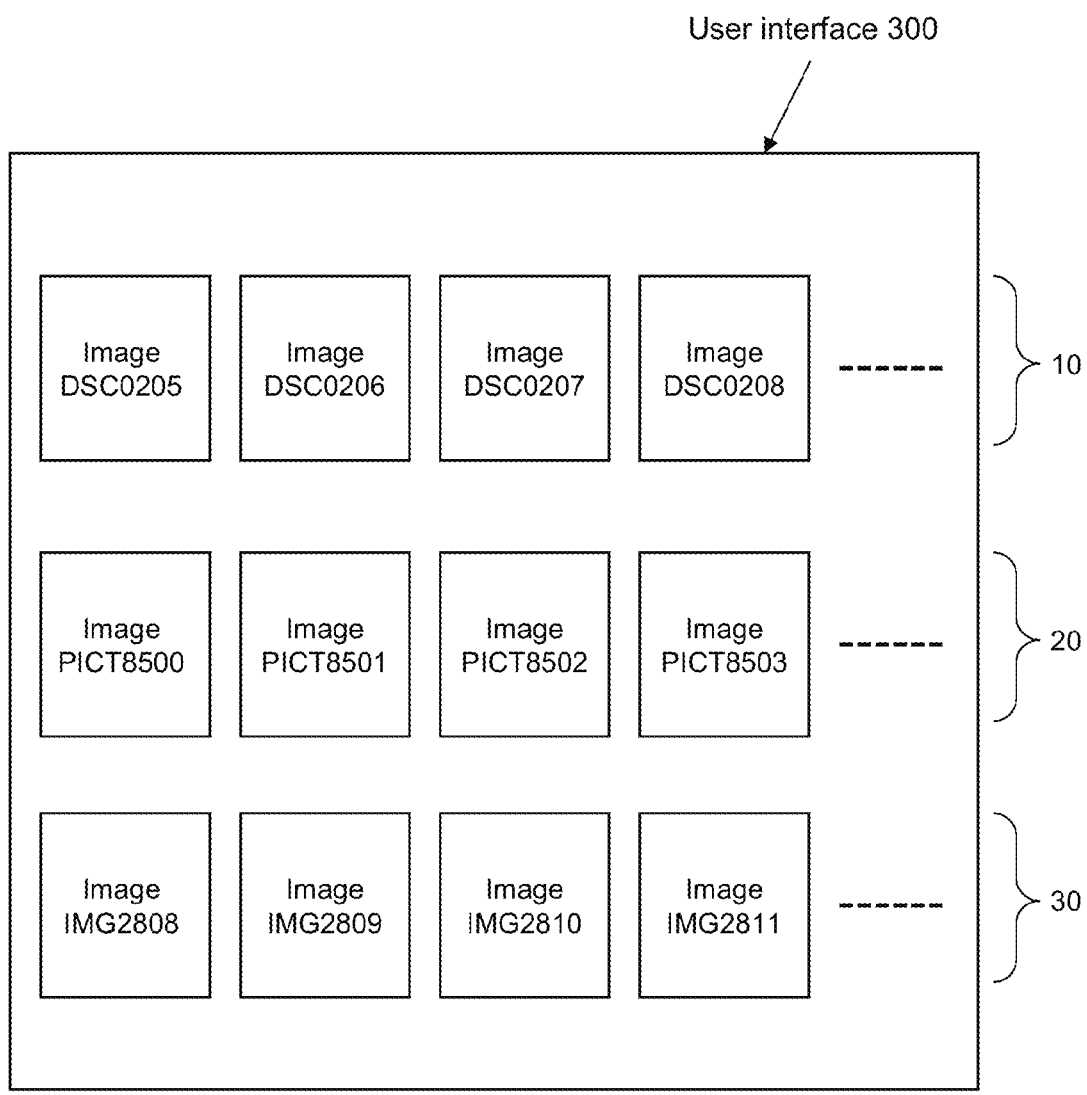
FIG. 3 illustrates a user interface comprising images obtained by different image capture devices.

In accordance to the present invention, the images from different image capture devices can be intelligently organized on a standalone computer device such as the computer device 60 and the wireless device 61, or, over the computer network, by a remote computer system such as the data center 30 and the computer processor 36. Referring to FIGS. 2 and 3, the digital images from different image capture devices are first separated by file names and/or their respective manufacturers and models (step 210, FIG. 2). Digital images from different image capture devices (such as cameras 62, 63, video cameras, or a mobile phone) usually have different file names such as DSC0205-DSC0208, PICT8500-PICT8503, IMG2808-2811 . . . etc., as shown in a user interface 300. The numbers after the alphabet characters indicate the sequence in which the images are captured by the specific image capture device. For example, the images from three cameras are separated into different groups 10, 20, and 30.

The user interface 300 can be provided by a software application installed on the computer device 60 (or the mobile device 61), which facilitates image viewing, organization, editing, rendering, and/or image product design using images on the same computer device (or mobile device). The user interface 300 can also be implemented as a web browser or a client application, which serves as a communication interface with a remote server such as server 32 via a computer network such as the Internet 50 or the wireless network 51.

The capture times of the images are then extracted from the images from each image capture device (step 220, FIG. 2). The image capture times are often stored in the EXIF files associated with the images. The images from each image capture device are then sequenced using the native image capture times originally stored by the image capture devices (step 230, FIG. 2). Although the clock of an image capture device may not reflect the real time and date, the native capture times of the image capture device can provide correct relative chronological order (but may not reflect the correct absolute times) for images captured by that image capture device. For example, the images DSC0205-DSC0208 in the group 10 are chronologically sequenced according to their respective natively recorded capture times. Similarly, the images in the group 20 and the group 30 are respectively sequenced using the image capture times of their respective image capture devices.

However, because the clocks of different image capture devices are often not correctly set, the images in the different groups 10, 20, 30 cannot be sequenced using a common capture time. For images taken at the same time, the image capture times recorded by different image capture devices often differ by an offset because some or all of the image capture devices do not have the correct dates and times.

Figure 4:
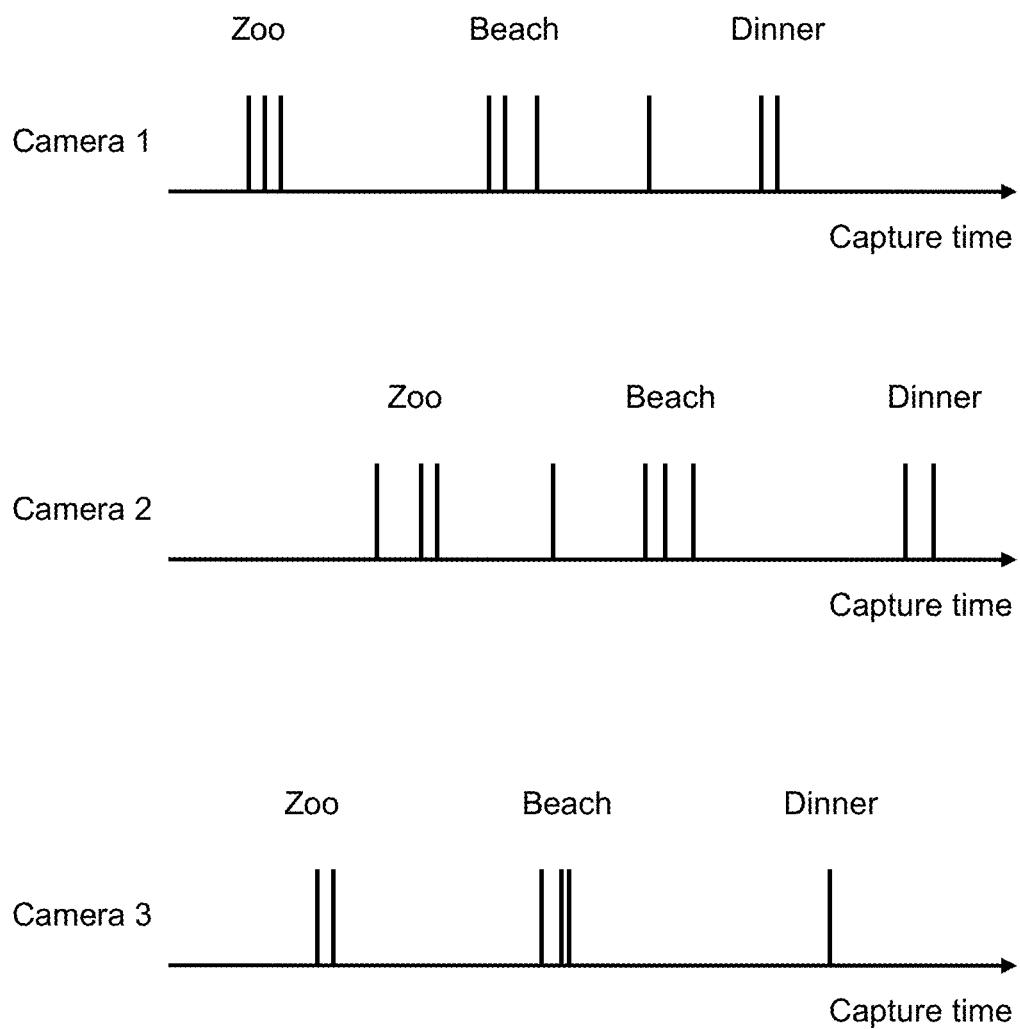
FIG. 4 illustrates image counts along the capture time respectively recorded by different image capture devices.

The offsets on image capture times between different image capture devices can be determined manually or automatically (step 240, FIG. 2). FIG. 4 illustrates image capture times of images captured by different cameras. Image captures by camera 1, camera 2, and camera 3 are plotted against their respective native capture times. Images captured by the three cameras are clustered around events such as "zoo", "beach", and "dinner", which however are recorded with different the image capture times on different cameras.

Figure 5:
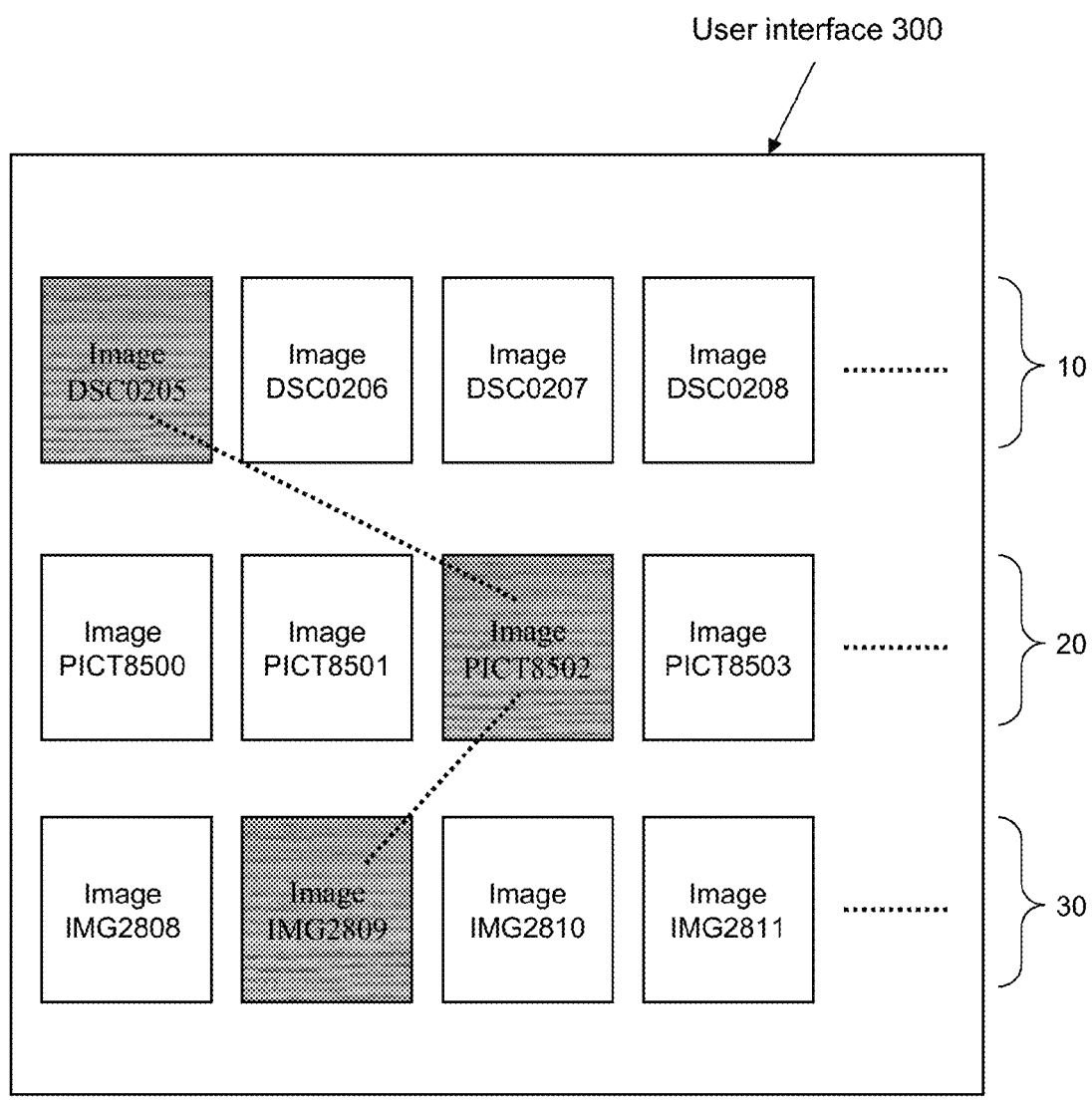
FIG. 5 illustrates user enabled correlation between images obtained by different image capture devices at the user interface shown in FIG. 3.

In some embodiments, the offset time can be manually determined with the assistance of a user. As shown in FIG. 5, the user can use the image content as clues to select images in different groups 10, 20, 30 that were captured at approximately the same times. For example, if images DSC0205, PICT8502, IMG2809 include the same scene (e.g. kids building sand castle on a beach), the user can remember or infer that these images from different cameras are taken at about the same time. The user can click and highlight one image (e.g. DSC0205, PICT8502, IMG2809) in each group 10, 20, 30 to identify these images as being taken at about the same time.

Figure 6:
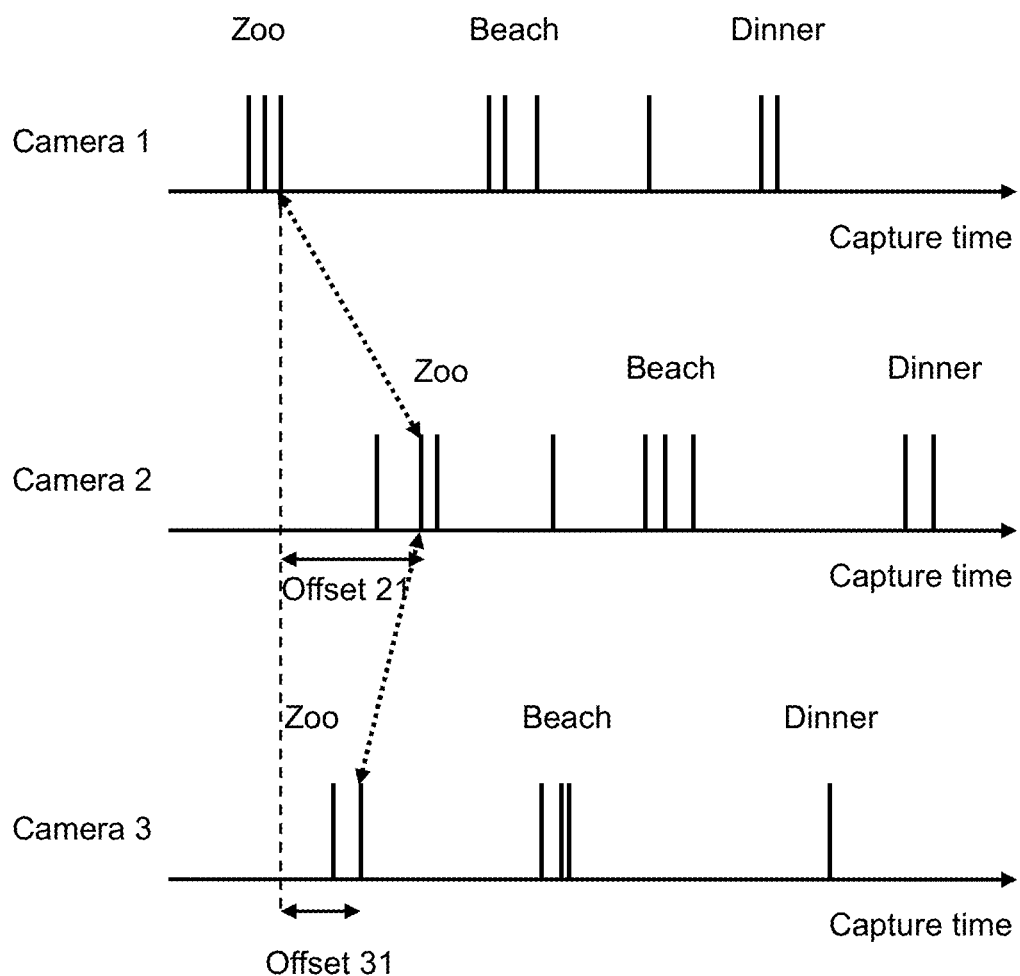
FIG. 6 illustrates the correlation and offsets between the capture times natively recorded by different image capture devices.

Referring to FIG. 6, the correlations between images DSC0205, PICT8502, IMG2809 are illustrated by the double-headed arrows connecting the images from different cameras. The offset between cameras 1 and camera 2 is indicated by offset 21. The offset 21 is related to the differences between the clock times of camera 1 and camera 2. The offset between cameras 1 and camera 3 is indicated by offset 31. Once the images taken by different cameras at about the same time are correlated by the user, the computer device 60 or the computer processor 36 (FIG. 1) can calculate offset 21 (step 240, FIG. 2) by subtracting the capture time of the image PICT8502 by the image capture time of the image DSC0205. Similarly, the computer device 60 or the computer processor 36 (FIG. 1) can calculate offset 31 (step 240, FIG. 2) by subtracting the capture time of the image IMG2809 by the image capture time of the image DSC0205.

Figure 7A:
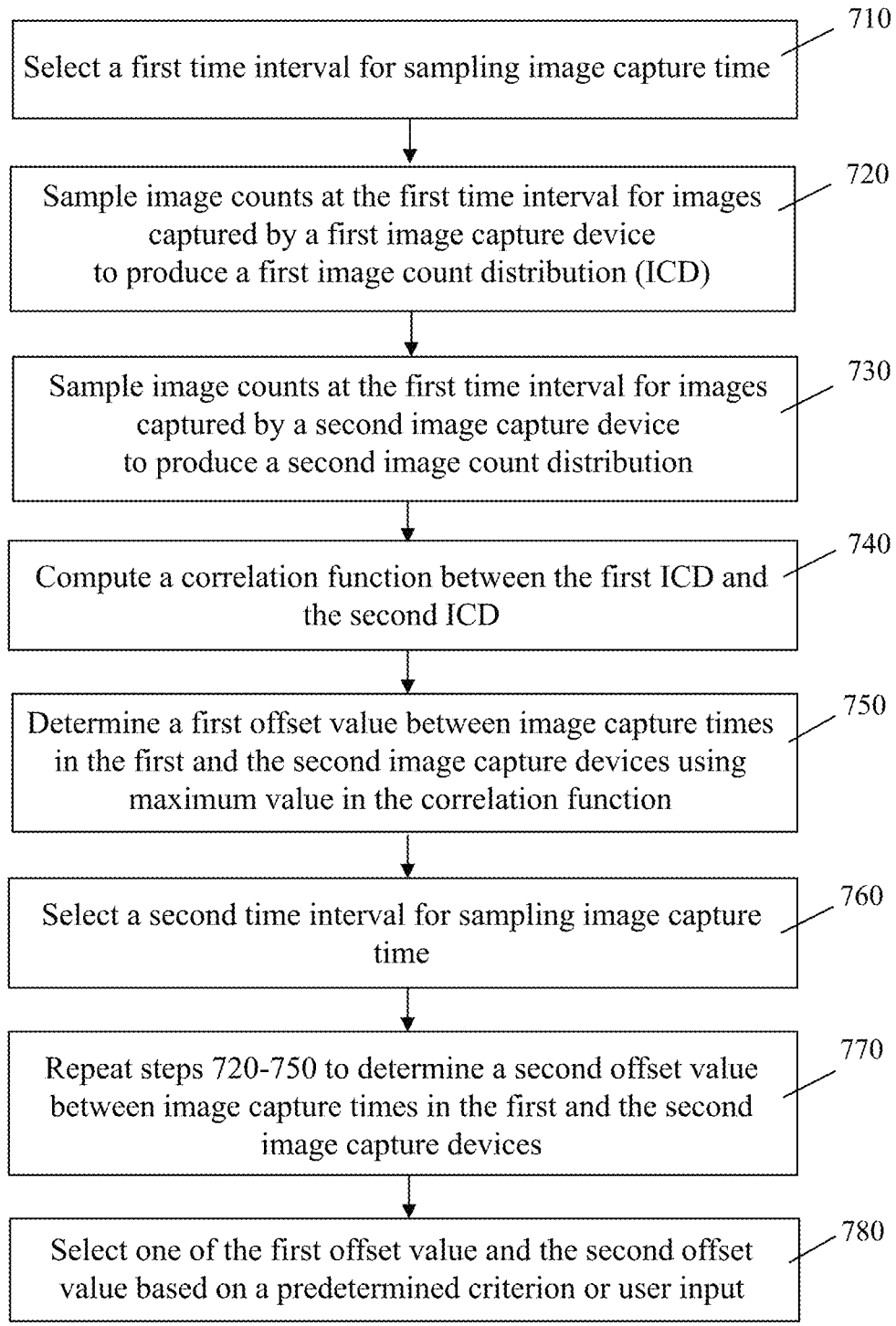
FIG. 7A shows steps for automatically determining offset between image capture times recorded by two image capture devices in accordance with the present invention.
Figure 8:
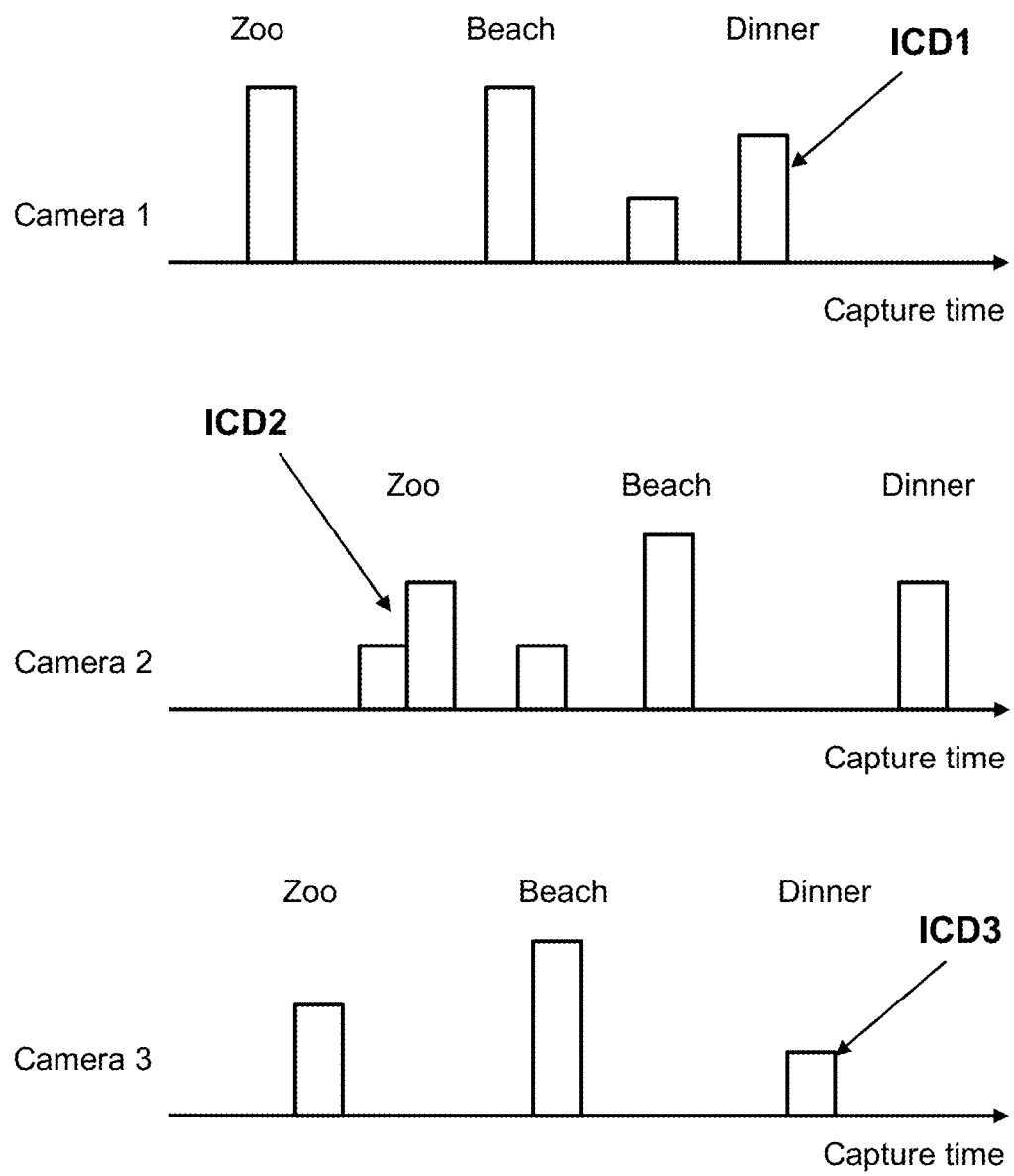
FIG. 8 illustrates image counts sampled at predetermined time intervals along the image capture time for each of the image capture devices.

In some embodiments, referring to FIG. 7A, the offsets between image capture times of different cameras can be automatically determined by a computer processor in the computer device 60 or the mobile device 61, or the computer processor 36. A time interval e.g. 5 min or 10 min is selected (step 710). For each camera, the image counts can be sampled along its natively recorded image capture time, in other words, all images captured in each time interval is summed up and recorded as the image count for that time interval (steps 720, 730). The resulting image counts distributions (ICDs) for images from different camera 1 (ICD1), camera 2 (ICD2), and camera 3 (ICD3) are shown in FIG. 8. The images taken by the three cameras at the same event ICDs also differ by offsets similar to the raw image counts as shown in FIGS. 4 and 6.

Figure 9:
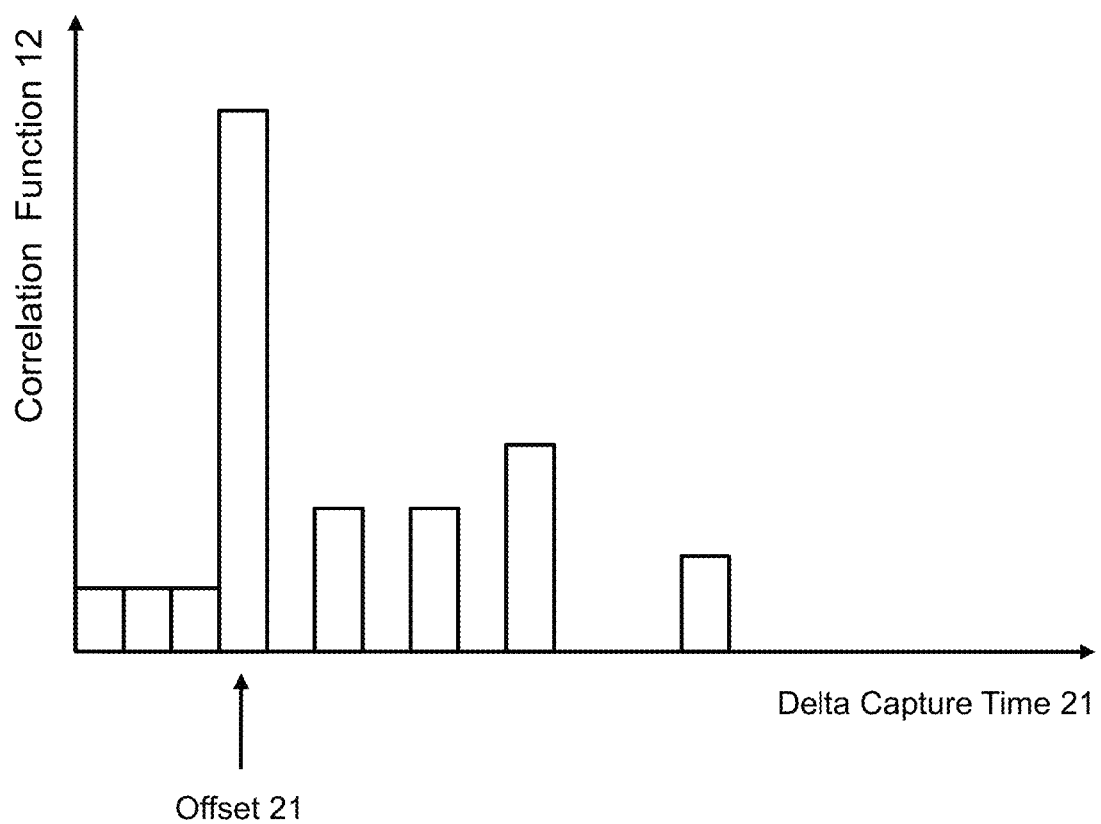
FIG. 9 shows a correlation function of the image count distributions for two cameras.

Referring to FIG. 9, a correlation function 12 between ICD1 and ICD2 can be calculated (step 740) by the computer device 60, the mobile device 61, or the computer processor 36 (FIG. 2). Most pictures on camera 1 and camera 2 are both taken mostly at "photographic events" (e.g. zoo, beach). Picture taking at other times are few and not correlated between the two cameras. The correlation between ICD2 and ICD1 should be peaked at the offset 21, when plotted as a function of the delta capture time 21 (the difference between the capture times of the two cameras). In other words, the maximum value of the correlation function can be used to determine the offset 21 in the capture times (or the clock and dates) between the two cameras (step 750). Similarly, offset 31 can be automatically determined by the computer device 60 or the computer processor 36 (FIG. 2) by computing the correlation function between ICD3 and ICD1.

The precision and the accuracy of the offset times can be improved by varying the time interval for sampling the image counts. While short time intervals (e.g. 15 seconds, 30 seconds, 1 min, etc.) can be precise in sampling image capture times, the image count within each time interval is low and so is the chance that two cameras capture images at exactly the same moment. The correlation functions can often be noisy for accurately determining offset. On the other hand, although long time intervals (e.g. 60 min, 90 min, etc.) tend to include higher image counts per time interval, there is a higher probability that different events are covered in the same time interval, which decreases the specificity in correlating different events. By selecting a second time interval (step 760), a second offset value can be determined using steps 720-750 between the image capture times of the first and second cameras (step 770). An offset value can be selected among different values based on a predetermined criterion such as a higher signal-to-noise ratio (e.g. the maximum value relative to background) at a narrower peak width in the correlation function (step 780). Varying the duration of time interval can optimize the temporal precision (relating to peak width) and the accuracy (relating to sign-to-noise ratio) in the determination of the offset. For example, an optimal period may be found in a range including 2 min, 5 min, 10 min, 15, min, 20 min, 30 min, and 45 min time intervals for sampling image counts in ICDs.

In some embodiments, an offset value can be selected among different offset values (step 780) based on user input as described in relation to FIGS. 5 and 6. Comparing to the steps described in FIGS. 5 and 6, the automatic correlation can help pre-screen possible offsets to make it easier for the user to identify the corresponding photo events between different image capture devices.

Figure 7B:
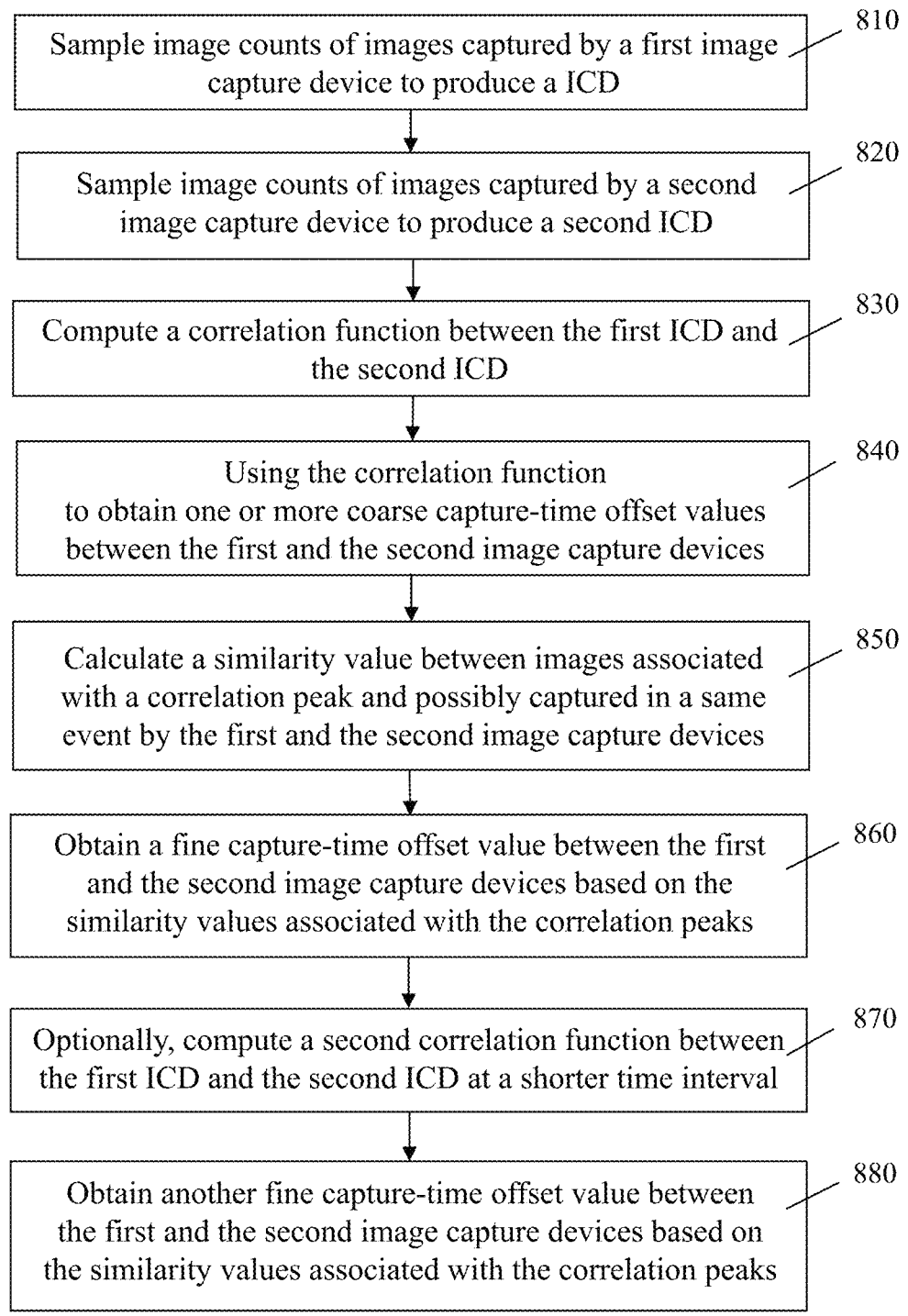
FIG. 7B shows steps for automatically determining offset between image capture times recorded by two image capture devices with user input in accordance with the present invention.

In some embodiments, accuracy of determining capture-time offset between different image capture devices can be improved by further intelligence and image analysis. Referring to FIG. 7B, similar to steps 720 and 730 described above (FIGS. 7A, 8), image counts of images captured by the first image capture device are sampled to produce a first image count distribution (step 810). The time interval used in the ICD calculations can be relatively coarse, for example, at 10 min, 20 min, 30 min, or even 60 min, which can increase image counts per interval. Image counts of images captured by the second image capture device are sampled to produce a second image count distribution (step 820). A correlation function between the image count distributions can be calculated (step 830) by the computer device 60, the mobile device 61, or the computer processor 36 (FIG. 2) similar to the step 740 described above (FIG. 7A, FIG. 9). The correlation function can include multiple peaks that are identified to be above a predetermined threshold. The delta capture times at these peaks represent potential or coarse capture-time offsets between the first and the second image capture devices (step 840).

Images associated with one of correlation peaks above threshold are potentially recorded at a same event by the two image capture devices. Since image objects and image content generally are similar in images recorded at the same event, a similarity value is computed between images associated with a same correlation peak and captured by the two image capture devices (step 850).

The similarity values for images associated with correlation peaks can be calculated using a similarity function based on multiple parameters such as colors, textures, directional similarities, objects found on image, geo location tags (if present), faces and bodies detected in an image, texture and colors of hair and hats if found in the images, detected objects, recognized objects, or sizes and/or prominence of objects in the images. A similarity function can be a sum, a weighted sum, a sum of squares of the correlation value of one or more of the multiple parameters.

A fine capture-time offset value is obtained between the first and the second image capture devices based on the similarity values associated with the correlation peaks (step 860). A correlation peak can be selected when its associated similarity value between images from the two different image capture devices is above a predetermined similarity threshold and by the higher similarity value.

Optionally, a second correlation function between the two ICDs can be calculated using a shorter time interval (step 870) similar to the steps 760 and 770 described above (FIG. 7A). Another fine capture-time offset value can be obtained based on similarity values between images captured by the different image capture devices at the shorter time interval (step 880).

In some embodiments, when three or more image capture devices are involved, the calculated capture-time offsets among the three or more image capture devices need to be unified to be consistent with each other (step 245). For example, if the calculated offset 12 (between the first and second image capture devices) is 12 min and the calculated offset 23 is 2 min, but the calculated offset 13 is 19 min instead of about 14 min, which results in inconsistency. On way to overcome this is to calculate multiple possible offsets above a threshold for each pair of image capture devices as described in steps 840-880 in FIG. 8. A consistent offset can be selected among several options. For example, if the calculated offsets 23 include 2 min and 6.5 min, the offset value 6.5 min is selected because 12 min+6.5 min is approximately 19 min. Another method of achieving consistency between offsets of three or more capture-time image capture devices is rely on the offsets with higher correlation strengths or higher similarity values, and to override the offset with lower correlation strengths or lower similarity value. Using the above described example, if the calculated offset 12 of 12 min and the calculated offset 23 of 2 min have higher correlation strengths or higher similarity values than the calculated offset 13, then the calculated offset 23 is overridden. The offset 23 is derived by the sum of the calculated offset 12 min and the calculated offset 23, which results in 14 min.

Figure 10:
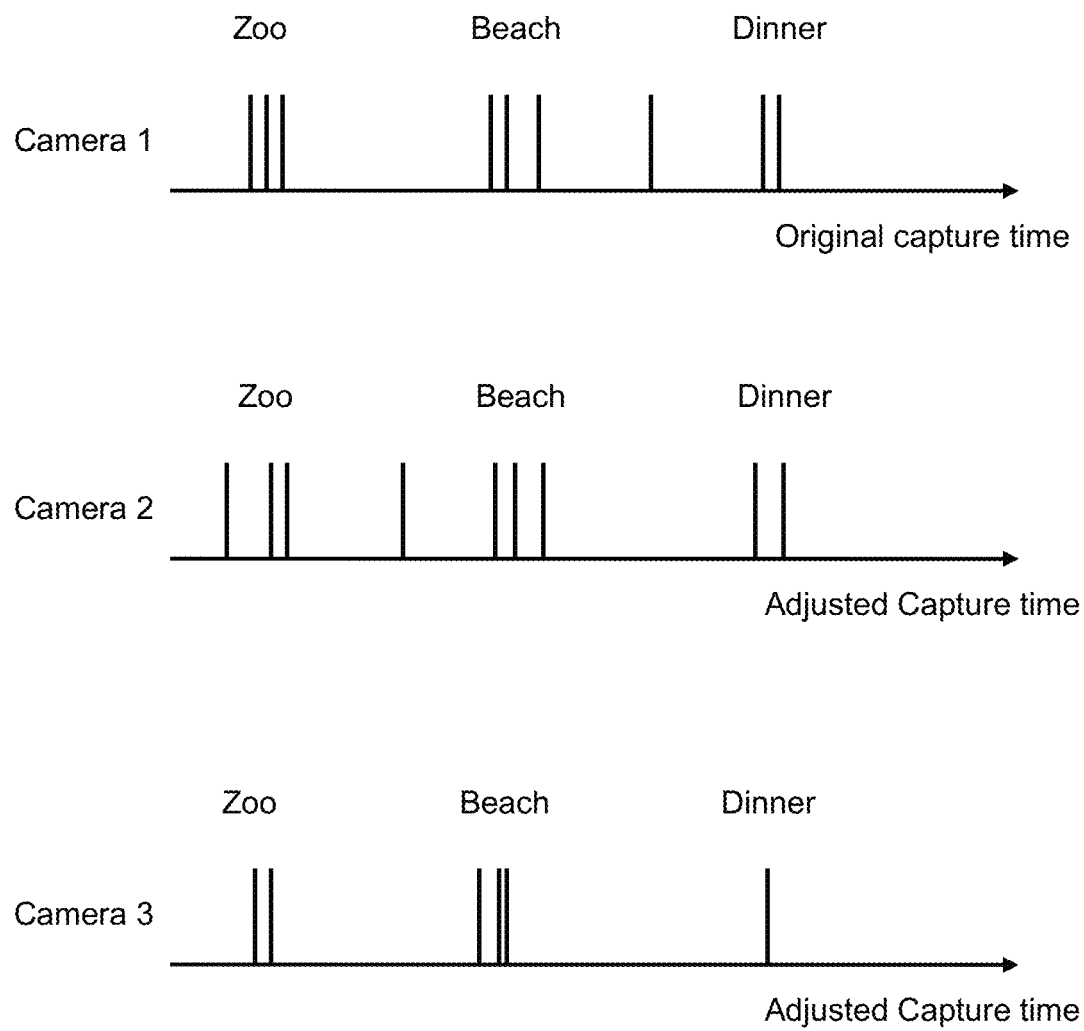
FIG. 10 shows image counts plotted against adjusted image capture times.

Once the offsets (e.g. Offset 12 and Offset 13) in the capture times between cameras are determined (automatically or manually or a combination of both), the offsets are subtracted from the respective capture times of the different image capture devices (step 250, FIG. 2) to product adjusted capture times. For example, the capture time of camera 1 can be used as a common reference. The capture times of images by camera 2 are subtracted by offset 21 such that the image capture times of images obtained by both camera 1 and camera 2 are based on the original capture time of camera 1. Similarly, the capture times of images by camera 3 are subtracted by offset 31. The adjusted capture times are stored in association with their respective images obtained by cameras 2 and 3 (step 260, FIG. 2). The adjusted capture times can for example be stored in the respective EXIF files or in a separate metadata field. Since the native capture time of camera 1 is used as the standard base capture time, no adjustment is needed for the capture times for images from camera 1. FIG. 10 shows that the image counts of camera 2 and camera 3 are plotted against the adjusted image capture times.

Figure 11:
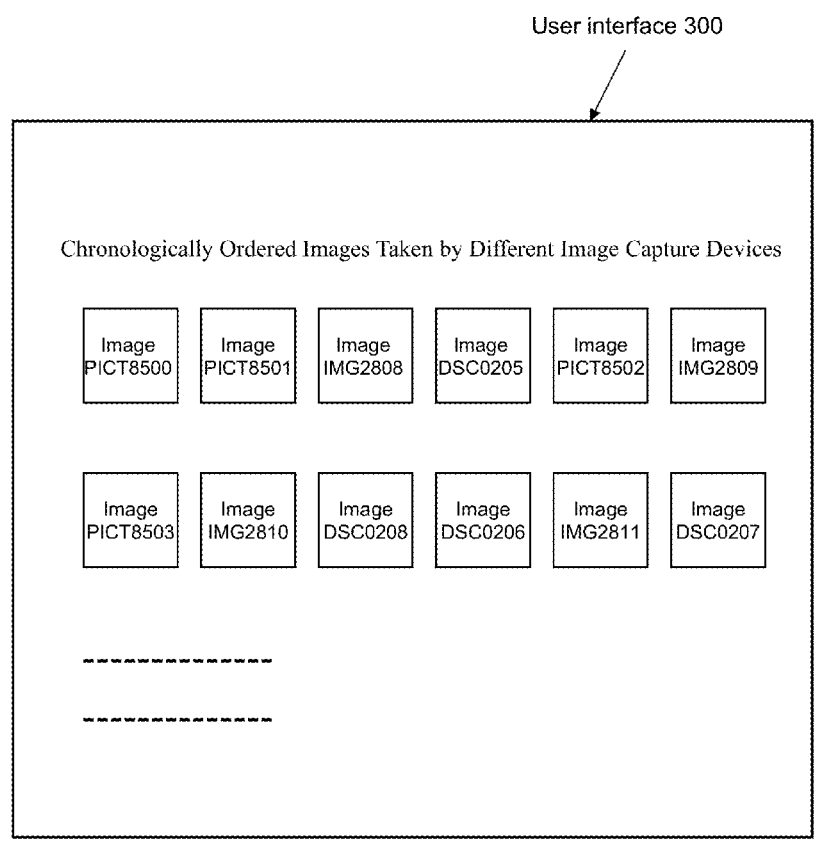
FIG. 11 shows the intelligently sequenced images taken by different image capture devices.

The images from image capture devices (camera 2-3) are sequenced using their respective adjusted capture times (step 270, FIG. 2). The images obtained by camera 1 are based on their originally recorded image capture times because they are used as the reference for determining the offset (so the adjusted image capture times for camera 1 are the same as the original image capture times). The images from different image capture devices (cameras 1-3) are combined in a list in the user interface 300, and sequenced in a chronological order based on adjusted image capture times (cameras 2, 3) on the computer device 60, the mobile device 61, or enabled by the server 32, as shown in FIG. 11 (step 280, FIG. 2). The common image capture times for camera 1, 2, and 3 can be called "unified image capture time".

In the present invention, it is not necessary that the capture time used as the common reference is set as the correct time and date. In some cases, none of the cameras has the time and date. The images from different cameras or other image capture devices can be chronically sequenced without knowing or using the correct date or time.

After the images from different cameras are combined in a single group in the user interface 300 and sequenced in a chronological order based on unified image capture times, the user 70, 71 can create an image product such as a photobook or a web media such as a blog page, using the images from different image capture devices based on the unified image capture times (step 290, FIG. 2). The web media containing the images can be published by the server 32 via computer network in the chronicle sequence based on the unified image capture times.

The image product such as the photobook can be locally produced, or ordered by the user 70, 71 at the data center 30 and then sent to product a fulfillment center 40, 41, which produces the ordered products, and deliver the recipients (100, 105 in FIG. 1) specified by the user 70, 71. The product fulfillment center 40 includes a server 42, and the storage and retrieving systems for pre-made off-the-shelf products. For the fulfillments of personalized image products, the product fulfillment center 40 can include one or more printers 45 for printing images, finishing equipment 46 for operations such as cutting, folding, binding the printed image sheets, and shipping stations 48 for verifying the orders and shipping the orders to recipients 100 and 105. Examples of the printers 45 include can be digital photographic printers, offset digital printers, digital printing presses, and inkjet printers. The finishing equipment 46 can perform operations for finishing a complete image product other than printing, for example, cutting, folding, adding a cover to photo book, punching, stapling, gluing, binding, and envelope printing and sealing. The shipping stations 48 may perform tasks such as packaging, labeling, package weighing, and postage metering.

An advantageous application for chronically sequencing images from different capture devices is the creation of photobooks. A photobook may utilize hundreds of images from different cameras. Most users like to place images on the book pages in a chronological order: earlier images appear on the first few pages while later images appear on the later pages. Once the images are correctly sequenced, it is much easier for a user to select and place images onto the pages. In some embodiments, chronically sequenced images allow the images to be automatically placed on the book pages, which can greatly reduce the time and effort required for a user to create a photobook.

In some embodiments, some images received by a computer system do not come with information about their capture times. These images can be viewed and used by themselves, or with images that are associated with capture times. Because people remember and preserve their memories according to time, image capture times are very useful information in many image applications. In many image applications, it is necessary to properly sequence images in a correct chronological sequence or categorize images in intervals of a year, a quarter, a month or a day, etc. For example, for viewing and sharing of images, and storytelling using images, it is often desirable to organize images based on years, months, and days of the image capture times. Image capture times and a chronological sequence of images are also very useful in image product designs. For example, for photobooks and photo calendars, the placements of images within or across different pages can be assisted by capture times of the images, and/or a chronological sequence based on image capture times.

Figure 12:
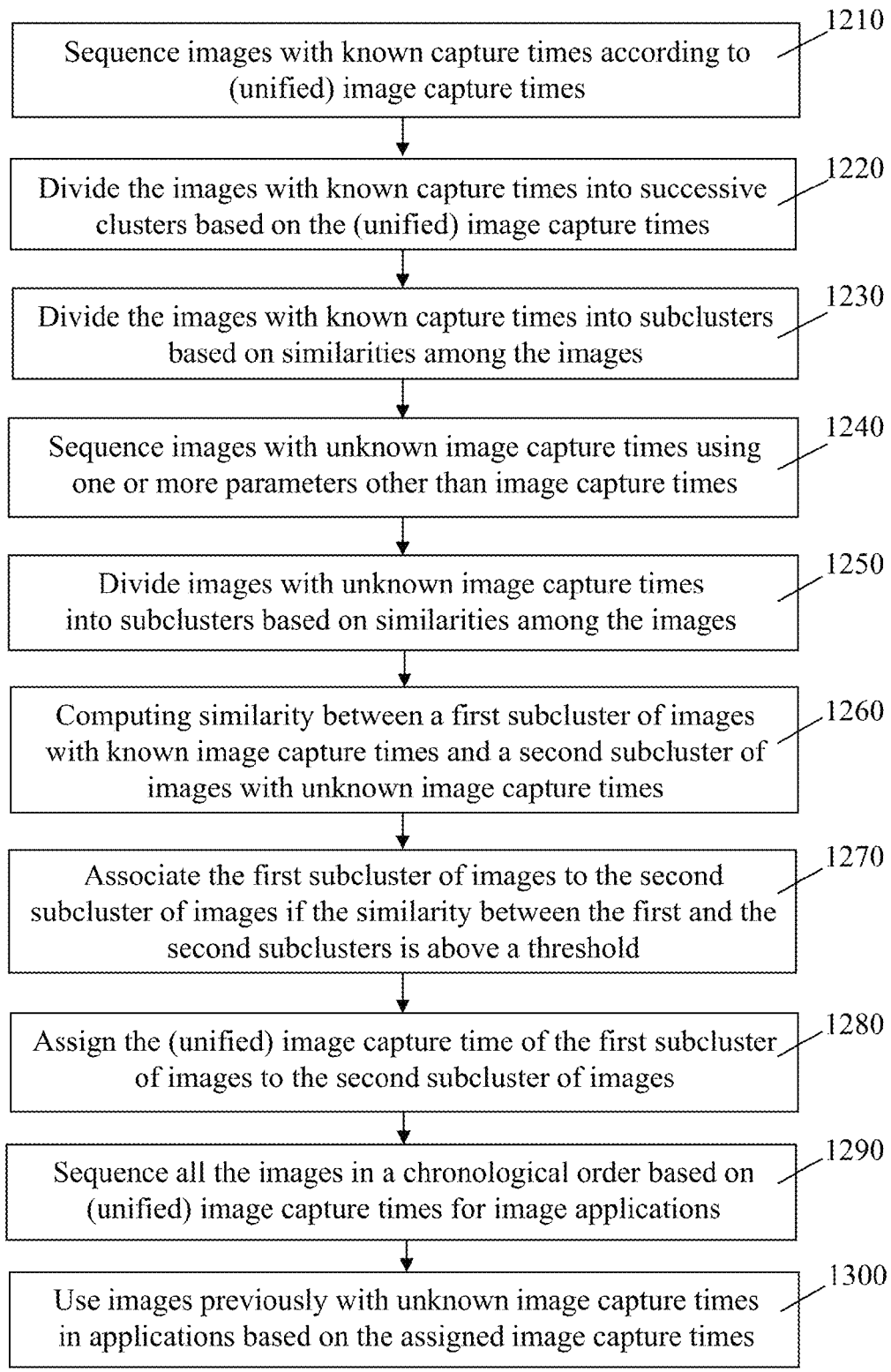
FIG. 12 is a flowchart for intelligently determining capture times of images with unknown capture times in accordance with the present invention.

Referring to FIG. 12, when images are received by a computer system, the images with known capture times are sequenced according to their image capture times (step 1210). The images may be obtained by different image capture devices, which may have offset in their clock times. As described above in relation to FIGS. 1-11, the offset between image capture times recorded by different image capture devices can be determined and adjusted to allow images from different image capture devices to be sequenced based their "unified adjusted capture times". When capture times are not adjusted, the "unified adjusted capture times" are the same as the image capture times recorded by image capture device(s).

The images having capture times are then divided and grouped into successive clusters based on their image capture times or unified capture times (step 1220). Each cluster comprises pictures taken at relative high rate in a short interval. Adjacent clusters are often separated by a pause in picture taking. For example, a set of images taken in relatively high rate after and/or before a long cease (for example, relative to the high rate) may be grouped into a cluster of time-related images. Details about clustering images are disclosed in the commonly assigned pending U.S. patent application Ser. No. 13/520,325, titled "System and method for creating a collection of images", filed on Jul. 2, 2012, the content of which is incorporated herein by reference.

The images having similar capture times within at least some of the clusters are then subdivided into subclusters based on similarities among the images (step 1230). Within each cluster, images sharing high similarity can be assigned into a same subcluster. The similarity value between images can be determined based on one or more of a non-exhaustive list of parameters such as dominant colors in an image, color distribution in an image, image capture location of an image, detected face(s) in an image, recognized face(s) in an image, the number of people in an image, size and/or prominence of the face(s) in an image, detected object(s) in an image, recognized object(s) in an image, size and/or prominence of the object(s) in an image, as well as exact image capture times of the images within the cluster, etc. A global weighted function based a plurality such parameters can be used to determine the overall similarity between two images. Details of grouping images in subclusters are disclosed in the commonly assigned pending U.S. patent application Ser. No. 13/520,325, titled "System and method for creating a collection of images", filed on Jul. 2, 2012, the content of which is incorporated herein by reference.

In many cases, images do not come with capture times. Some image capture devices may not have recorded capture times. Some images may have been stored at an intermediate location, such as a social network, in which the image capture times have been stripped or not shared. Some images may have been edited, cropped, and saved without capture times in their headers. As described above, in many applications, it is very useful and often necessary to determine the capture times of these images. The image capture times can be based on true time, or on the basis of unified image capture times, which both define the relative chronological sequence between images.

The images with unknown capture times are first sequenced (step 1240) by parameters (other than capture times) such as their file names (often embedded with a sequential number by the image capture devices), the times at which the images are respectively received by or uploaded to the computer system, the times at which the images are respectively processed, etc.

The images with unknown capture times are then divided into subclusters based on similarities among the images (step 1250). Successive images in the sequence that share high similarities are assigned into a same subcluster. Similar to the subclustering of the images with known image capture times, the similarity between images can be determined based on differences between the images in image content and image properties, such as, dominant colors in an image, color, intensity or gradients distribution in an image, image capture location of an image, detected face(s) in an image, recognized face(s) in an image, the number of people in an image, size and/or prominence of the face(s) in an image, detected object(s) in an image, recognized object(s) in an image, and size and/or prominence of the object(s) in an image, etc. A global weighted function based a plurality such parameters can be used to determine the overall similarity between two images. Details of dividing images in subclusters are disclosed in the commonly assigned pending U.S. patent application Ser. No. 13/520,325, titled "System and method for creating a collection of images", filed on Jul. 2, 2012, the content of which is incorporated herein by reference.

To determine image capture times of images with unknown capture times, the computer system computes a similarity value between a first subcluster of images with known image capture times and a second subcluster of images with unknown capture times (step 1260). If a second subcluster of images is found to be similar to a first subcluster of images, that is, if the similarity value between the two subclusters is above a threshold, the second subcluster of images is associated with the first subcluster of images (step 1270). The similarity value between subclusters of images with unknown capture times and known capture times can be calculated based on the differences of parameters in image content or properties between the two subclusters. Examples of the parameters include: dominant colors in an image, color, intensity or gradients distribution in an image, image capture location of an image, detected face(s) in an image, recognized face(s) in an image, the number of people in an image, size and/or prominence of the face(s) in an image, detected object(s) in an image, recognized object(s) in an image, and size and/or prominence of the object(s) in an image, etc. A global weighted function based a plurality such parameters can be used to determine the overall similarity between two images.

In some embodiments, the parameters for similarity calculations are used to set up a topological space. The topological distance between the first subcluster and the second subcluster in the topological space is calculated. The topological distance indicates the combined dissimilarity between the two subclusters, taking into account all the parameters that constitute the topological space. A larger topological distance indicates a larger combined dissimilarity between the two subclusters. The topological distance can be calculated based on the calculated differences in parameters. When the topological distance is smaller than a predetermined threshold, the first subcluster and the second subcluster can be considered as similar. The determination of the threshold may be performed by statistical analysis, which may be performed by the computer system. The threshold may be different for different groups of images or different clusters of images with known image capture times, according to particular statistical analyses.

When the first cluster and the second cluster are found to be similar (i.e. with the similarity value above a threshold), a (unified) capture time of the first subcluster of images is assigned to the second subcluster of images with unknown capture times (step 1280). Since the images in the second subcluster of images are likely taken in a short time segment, they can be assigned to a same (unified) image capture time.

In some embodiments, if a second cluster of images with unknown capture times can be matched to any of the first cluster of images with known capture times using the similarity calculations, the image capture times of that second cluster of images can be interpolated by the assigned image capture times of other adjacent second clusters of images with unknown capture times assuming the images with unknown capture times are sequenced as described above (step 1240).

As images previously with unknown image capture times are now assigned with (unified) image capture times, both types of images (previously with known or unknown capture times) can now be sequenced based on a common (unified) image capture time (step 1290). The sequence of images can be presented for image applications such as image displaying and publishing, image sharing, image product designs such as photobooks and photo calendars, and photo storytelling, etc.

The images previously with unknown capture times can generally be used in image applications based on the assigned image capture times (step 1300). For example, the design of a greeting card or a calendar can incorporate an image previously without capture time information based on the image capture time assigned to the image. The image can be used in similar fashion in other applications such as photo story, photo blogs or publishing, photo sharing, and so on. The assigned image capture times can be stored as tags or keywords with images previously with unknown capture times to allow these images to be searched and categorized based on the assigned image capture times.

An advantage of the above disclosed methods is that images can be automatically comprehended by a computer system to allow intelligent usages of images to preserve people's memories. Another advantage of the above disclosed methods is that automatically inferred and more accurate information allow images to be presented in ways more natural to the narratives of people's memories. The above disclosed methods can also significantly save time that people spend on organizing photos and creating image product designs.

It should be noted that the image applications of the above disclosed methods and systems are not limited to the examples described above. The image applications include physical image products, digital or virtual image presentations, as well as motion or video image applications.

Detailed configurations and steps can differ from the examples described above without deviating from the spirit of the present invention. The computer systems suitable for the disclosed methods can include wired or wireless, networked or standalone devices. The disclosed methods are not limited to applications over computer network; rather, they are applicable to standalone computer devices such as personal computers, laptop computers, tablet computers, mobile devices, and other computing devices that can help users to organize images. The image capture devices, the computer devices, and the wireless devices are not limited to the examples used above.

What is claimed is:

1. A method for intelligently determining capture times of images for image applications, comprising:
    sequencing a first group of images with known image capture times in a chronological order based on image capture times;
    dividing the first group of images in the chronological order into first subclusters based on similarities between images, wherein the images in at least one of the first subclusters have a first similarity value higher than a first threshold, wherein the first similarity value is based on one or more of dominant colors, color distributions, image capture locations, detected faces, recognized faces, the number of people, sizes and/or prominence of the faces, detected objects, recognized objects, or sizes and/or prominence of objects in the images, wherein each of the first subclusters comprises images from the first group having adjacent image capture times;
    dividing a second group of images with unknown image capture times into second subclusters based on similarities between images;
    computing, by a computer system, a second similarity value between a first subcluster of images with known image capture times and a second subcluster of images with unknown image capture times; and
    assigning an image capture time of the first subcluster of images to the second subcluster of images if the second similarity value between the first subcluster of images and the second subcluster of images is above a second threshold, thereby producing a unified image capture times for the first subcluster of images to the second subcluster of images based on known image capture times of first subclusters and image capture times assigned to the second subclusters.

2. The method of claim 1, further comprising:
    sequencing the second group of images before the step of dividing a second group of images into second subclusters, wherein the second subclusters each comprise images adjacent in the sequence.

3. The method of claim 2, wherein the images in the second group are sequenced based on a parameter that is not image capture time.

4. The method of claim 3, wherein the images in the second group are sequenced based on a parameter selected from the group consisting of file names, image upload times, image reception times, and image processing times.

5. The method of claim 1, wherein the images in one of the second subclusters have similarities higher than a third threshold.

6. The method of claim 1, wherein the step of calculating a second similarity value between a first subcluster of images and the second subcluster of images comprises:
    calculating differences in one or more of parameters between the images in the first subcluster and the images the second subcluster, wherein the second similarity value is inversely related to the differences, wherein the one or more of parameters comprise one or more of dominant colors, color distributions, image capture locations, detected faces, recognized faces, the number of people, sizes and/or prominence of the faces, detected objects, recognized objects, or sizes and/or prominence of objects in the images.

7. The method of claim 1, wherein the step of computing, by a computer system, a second similarity value between a first subcluster of images with known image capture times and a second subcluster of images with unknown image capture times comprises:
    calculating differences of a set of parameters between the first subcluster of images and the second subcluster of images;
    setting up a topological space based on the set of parameters; and
    calculating a topological distance in the topological space between the first subcluster of images and the second subcluster of images based on the calculated differences, wherein the second similarity value is inversely related to the topological distance.

8. The method of claim 1, wherein the first group of images with known image capture times are obtained by multiple image capture devices, the method further comprising:
    adjusting, by an offset, image capture times recorded by at least one of the multiple image capture devices.

9. The method of claim 8, wherein the step of assigning comprising:
    assigning a unified image capture time of the first subcluster of images to the second subcluster of images if the second similarity value between the first subcluster of images and the second subcluster of images is above the second threshold, the method further comprising:

characterizing the first group of images by unified image capture times which adjust offset(s) between image capture times recorded by different ones of the multiple image capture devices.

10. The method of claim 1, further comprising:
sequencing the first group of images and the second group of images in a chronological order based on the unified image capture times.

11. The method of claim 10, further comprising:
incorporating at least some of the first group of images and the second group of images in the chronological order into a design of an image product.

12. The method of claim 11, wherein the image product comprises a photobook, a photo calendar, a photo story, a photo blog, or a photo slideshow.

13. The method of claim 10, further comprising:
displaying, sharing or publishing at least some of the first group of images and the second group of images in the chronological order.

14. The method of claim 1, further comprising:
incorporating at least some of the second group of images into a design of an image product based on the image capture times assigned to the second group of images.

15. The method of claim 14, wherein the image product comprises a photobook, a photo calendar, a photo story, a photo blog, or a photo slideshow.

16. The method of claim 1, further comprising:
displaying, sharing or publishing at least some of the second group of images based on the image capture times assigned to the second group of images.

17. The method of claim 1, further comprising:
tagging the second group of images by the image capture times assigned to the second group of images.

18. The method of claim 17, further comprising:
searching or categorizing the second group of images based on the image capture times assigned to the second group of images.

19. A method for organizing images from multiple image capture devices, comprising:
computing, by a computer system, a correlation function over image capture time between image counts of images captured by a first image capture device and image counts of images captured by a second image capture device, wherein the step of computing further comprising:
sequencing images captured by the first image capture device based on the image capture times recorded by the first image capture device;
sampling image counts of images captured by the first image capture device to produce a first image count distribution (ICD);
sequencing images captured by the second image capture device based on the image capture times recorded by the second image capture device;
sampling image counts of images captured by the second image capture device to produce a second ICD;
determining using the correlation function, by the computer system, a coarse offset between image capture times recorded in the first image capture device and image capture times recorded in the second image capture device, wherein the step of computing further determining:
computing a correlation function between the first ICD and the second ICD by the computer system;
identifying, in the correlation function, one or more correlation peaks that are above a correlation threshold; and
obtaining one or more coarse offsets from the one or more correlation peaks; and
subtracting the image capture times of images recorded in the second image capture device by the one of the one or more coarse offsets to produce adjusted image capture times for images captured by the second image capture device.

20. The method of claim 19, further comprising:
for the images associated with one of the one or more correlation peaks above the correlation threshold, computing a similarity value between images captured by the first image capture device and by the second image capture device by the computer system;
automatically determining a fine offset between the image capture times recorded in the first image capture device and the image capture times recorded in the second image capture device if the similarity value is above a similarity threshold value; and
adjusting the image capture times of the images captured by the second image capture device by the fine offset.

21. The method of claim 20, wherein the step of calculating a similarity value between images captured by the first image capture device and by the second image capture device comprises:
calculating differences in one or more of parameters between the images captured by the first image capture device and by the second image capture device, wherein the similarity value is inversely related to the differences, wherein the one or more of parameters comprise colors, color distributions, textures, image capture locations, faces and bodies detected in the images, recognized faces, the number of people, texture and colors of hair and hats if found in the images, sizes and/or prominence of the faces, detected objects, recognized objects, or sizes and/or prominence of objects in the images.

* * * * *